US009674767B2

(12) United States Patent
Moisiadis et al.

(10) Patent No.: US 9,674,767 B2
(45) Date of Patent: Jun. 6, 2017

(54) METHOD AND APPARATUS FOR FORMING A TIERED WIRELESS LOCAL AREA NETWORK (WLAN) SERVER TOPOLOGY

(75) Inventors: Alexandros Moisiadis, Stow, MA (US); Mohnish Anumala, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 549 days.

(21) Appl. No.: 13/224,413

(22) Filed: Sep. 2, 2011

(65) Prior Publication Data

US 2013/0060966 A1    Mar. 7, 2013

(51) Int. Cl.
| | |
|---|---|
| G06F 15/16 | (2006.01) |
| H04W 40/24 | (2009.01) |
| H04W 84/12 | (2009.01) |
| H04W 84/02 | (2009.01) |
| H04W 40/32 | (2009.01) |
| H04L 12/715 | (2013.01) |

(52) U.S. Cl.
CPC ........... *H04W 40/246* (2013.01); *H04L 45/04* (2013.01); *H04W 40/32* (2013.01); *H04W 84/02* (2013.01); *H04W 84/12* (2013.01)

(58) Field of Classification Search
CPC ..... G06Q 30/00; G06F 15/173; H04W 40/32; H04W 40/246; H04W 84/02; H04W 84/12
USPC ............... 709/249–250, 238–244, 202–203, 709/224–226; 370/400–401
See application file for complete search history.

(56) References Cited

U.S. PATENT DOCUMENTS

| | | | | |
|---|---|---|---|---|
| 6,016,318 | A * | 1/2000 | Tomoike | H04L 12/4608 709/249 |
| 7,155,494 | B2 * | 12/2006 | Czeiger et al. | 709/218 |
| 8,184,530 | B1 * | 5/2012 | Swan | H04W 76/022 370/401 |
| 8,339,991 | B2 * | 12/2012 | Biswas et al. | 370/254 |
| 8,650,299 | B1 * | 2/2014 | Huang | G06F 9/5077 709/226 |
| 2002/0087646 | A1 * | 7/2002 | Hickey et al. | 709/206 |
| 2002/0199015 | A1 * | 12/2002 | Tari et al. | 709/238 |

(Continued)

OTHER PUBLICATIONS

Define server at Dictionary.com.pdf—Dictionary.Com Server definition web page in PDF form.*

(Continued)

*Primary Examiner* — Bharat N Barot

(57) ABSTRACT

A method, apparatus and computer program product for forming a tiered Wireless Local Area Network (WLAN) server topology is presented. A Wireless Local Area Network (WLAN) having a plurality of Mobile Virtual Local Area Network (MVLAN) servers is broken into a plurality of zones, each zone including at least one MVLAN server. An Identifier (ID) is assigned to each zone. A MVLAN server in each zone is designated as a MVLAN gateway server, wherein MVLAN servers within a zone communicate with each other within the zone, wherein the MVLAN servers within a zone communicate directly with the MVLAN gateway sever within the zone, wherein MVLAN gateway servers communicate directly with each other, and wherein a MVLAN server within a first zone communicates with a MVLAN server in a second zone by way of the MVLAN gateway sever of the first zone and the MVLAN gateway server of the second zone.

15 Claims, 5 Drawing Sheets

(56) References Cited

U.S. PATENT DOCUMENTS

| | | | |
|---|---|---|---|
| 2003/0210671 A1* | 11/2003 | Eglin | H04L 12/4641 370/338 |
| 2003/0235175 A1* | 12/2003 | Naghian et al. | 370/338 |
| 2004/0022258 A1* | 2/2004 | Tsukada | H04L 63/0272 370/401 |
| 2004/0090972 A1* | 5/2004 | Barrett et al. | 370/401 |
| 2009/0323635 A1* | 12/2009 | Gras | H04W 36/0011 709/223 |
| 2010/0157963 A1* | 6/2010 | Choi | H04L 12/4633 370/401 |
| 2010/0290446 A1* | 11/2010 | Atreya et al. | 370/338 |
| 2010/0290465 A1* | 11/2010 | Ankaiah et al. | 370/390 |
| 2010/0293043 A1* | 11/2010 | Atreya et al. | 705/14.4 |
| 2012/0296963 A1* | 11/2012 | Lu | H04W 84/00 709/203 |

OTHER PUBLICATIONS

NPL1—(title:A Novel Location-Service Protocol Based on k-Hop Clustering for Mobile Ad Hoc Networks; IEEE Transactions on Vehicular Technology, vol. 56, No. 2, Mar. 2007; by Leng et al).*
NPL3—(title: A cluster-based trust-aware routing protocol for mobile ad hoc networks; wireless network (2010); by Safa et al.*

* cited by examiner

METHOD AND APPARATUS FOR FORMING A TIERED WIRELESS LOCAL AREA NETWORK (WLAN) SERVER TOPOLOGY

BACKGROUND

Wireless Local Area Network (LAN) deployments typically include a number of small Access Devices that serve as the wireless points that receive the wireless communication traffic from the end-user devices such as smart phones, tablets, Personal Digital Assistants (PDAs), laptop computers, and the like and then via Access Tunnels over Ethernet connections transfer the data to Mobility Virtual Local Area Network (MVLAN) Servers that further process and propagate the traffic to the Ethernet Switches/Routers in the wired network in order to reach their final destinations (other end-user devices or data/application servers). The MVLAN Servers form a full-mesh topology among themselves, where each of the MVLAN servers connects via Mobility Tunnels to all other MVLAN servers in the network.

SUMMARY

Conventional mechanisms such as those explained above suffer from a variety of deficiencies. One such deficiency is that as more and more network devices are being converted to work wirelessly, the current Wireless Network Server model, where each MVLAN server is connected via mobility tunnels to all other such MVLAN servers in a full mesh topology which does not scale, especially when deployed over an extended campus that includes several buildings.

The mobility tunnels which are used for protocol as well as data transfer, currently use standard encapsulations like Control and Provisioning of Wireless Access Points (CAPWAP) for transferring packet traffic (control, voice and data) between them which becomes cumbersome and bandwidth consuming when it is running on top of other deployed networking technologies requiring their own packet encapsulations (e.g. Virtual Private Network or VPN). In addition the full-mesh topology that the MVLAN servers employ in order to serve traffic in a speedy way, consume considerable internal resources for the creation and management of the tunnels, that would be better spent in the service of the actual data traffic.

Embodiments of the invention significantly overcome such deficiencies and provide mechanisms and techniques that break the flat WLAN Mobility VLAN topology into zones (also referred to as areas or domains) forming a tiered topology.

In a particular embodiment of a method for providing a tiered WLAN server topology the method includes, in a WLAN having a plurality of MVLAN servers, breaking the WLAN into a plurality of zones, each zone including at least one MVLAN server. The method further includes assigning an Identifier (ID) to each of the plurality of zones. Additionally the method includes designating at least one MVLAN server in each of the plurality of zones as a MVLAN gateway server, wherein MVLAN servers within a zone communicate with each other within the zone, wherein the MVLAN servers within a zone communicate directly with the MVLAN gateway sever within the zone, wherein MVLAN gateway servers communicate directly with each other, and wherein a MVLAN server within a first zone communicates with a MVLAN server in a second zone by way of the MVLAN gateway sever of the first zone and the MVLAN gateway server of the second zone.

Other embodiments include a computer readable medium having computer readable code thereon for providing a tiered WLAN topology. The computer readable medium includes instructions for, in a Wireless Local Area Network (WLAN) having a plurality of Mobile Virtual Local Area Network (MVLAN) servers, breaking the WLAN into a plurality of zones, each zone including at least one MVLAN server. The computer readable medium further includes instructions for assigning an Identifier (ID) to each of the plurality of zones. Additionally the computer readable medium includes instructions for designating at least one MVLAN server in each of the plurality of zones as a MVLAN gateway server, wherein MVLAN servers within a zone communicate with each other within the zone, wherein the MVLAN servers within a zone communicate directly with the MVLAN gateway sever within the zone, wherein MVLAN gateway servers communicate directly with each other, and wherein a MVLAN server within a first zone communicates with a MVLAN server in a second zone by way of the MVLAN gateway sever of the first zone and the MVLAN gateway server of the second zone.

Still other embodiments include a computerized device (e.g., a MVLAN gateway server), configured to process all the method operations disclosed herein as embodiments of the invention. In such embodiments, the computerized device includes a memory system, a processor, communications interface in an interconnection mechanism connecting these components. The memory system is encoded with a process that provides a tiered wireless WLAN server topology as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a tiered wireless WLAN server topology as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
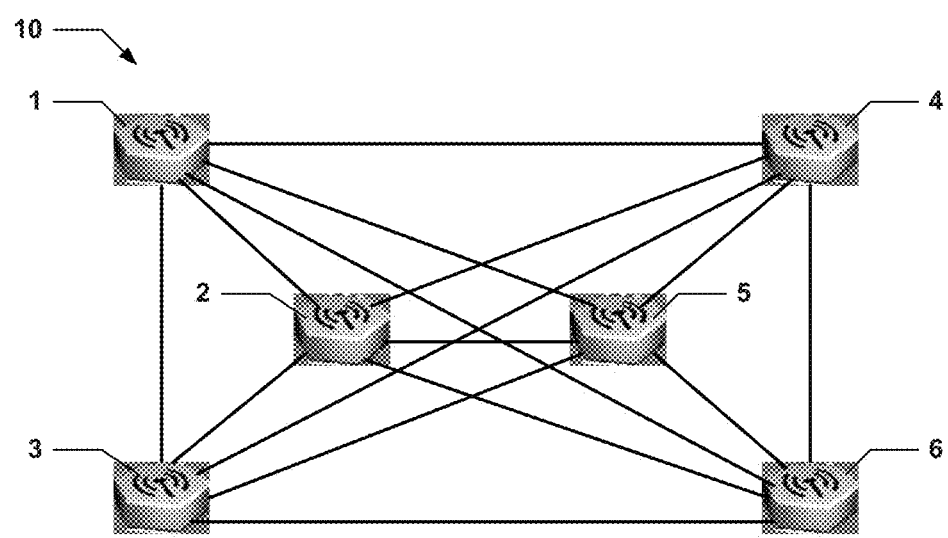
FIG. 1 comprises a block diagram of a prior art Wireless Local Area Network (WLAN) server topology.

The mobility tunnels of a Wireless Local Area Network (WLAN) typically use the standard CAPWAP encapsulation for transferring traffic between them. This comes in conflict and creates additional bandwidth consumption when it is deployed on top of VPN technologies like Shortest Path Bridging MACinMAC (SPBM) or MultiProtocol Label Switching (MPLS) or Internet Protocol Virtual Private Network-Lite (IPVPN-Lite). Hence in networks that either have existing WLAN Mobility VLAN Servers, or campus networks comprised of several buildings that need to interconnect their Wireless traffic, a different model is needed that will scale well.

Embodiments of the present invention employ a model of a hierarchical nature, with the WLAN Mobility VLAN Servers partitioned in zones (also referred to herein as areas or domains) that are connected via designated WLAN Mobility VLAN servers behaving as Mobility VLAN gateways between the individual zones. All Mobility VLAN servers within a WLAN zone that carries a unique WLAN zone Identification (ID) number form a full-mesh topology and the designated Mobility VLAN Servers acting as Mobility VLAN gateways in each zone form a full-mesh topology among themselves interconnecting the distinct zones. In such a manner, a hierarchical WLAN topology is created which reduces the overall number of Mobility Tunnels utilized in the network. The tunnel encapsulation is either negotiated or configured between any two WLAN Mobility VLAN gateways thus helping reduce the amount of translation that might be needed in these cases. In each WLAN Zone, the WLAN Controller and Mobility VLAN servers associate each Mobility VLAN server with the WLAN Zone ID. The WLAN Mobility VLAN gateways collect the information regarding the Mobility VLANs and their associated WLAN Zone ID that are being served locally by all the WLAN Mobility VLAN server devices within their domain and then provide that information via the mobility gateway tunnels to all the other WLAN Mobility VLAN gateways in the other zones. This information is exchanged periodically between them or when a change occurs thus always reflecting the current state of the specific WLAN Zone. Within their zone, each WLAN Mobility VLAN gateway advertises to the rest of the internal WLAN Mobility VLAN servers that they serve all those Mobility VLANs they have received through the advertisements from the rest of the Mobility VLAN gateways outside their respective zone. WLAN Mobility VLAN gateways after being configured as such, could multicast a discovery packet using the standard CAPWAP encapsulation, which contains their WLAN Zone Id and their packet encapsulation capabilities to be used for transport within the Mobility VLAN Mobility gateway tunnels in a prioritized format. Other WLAN Mobility VLAN gateways respond to this message with their own information thus establishing a gateway tunnel with the newly discovered WLAN Mobility VLAN gateway and choose an encapsulation method for the specific gateway tunnel. This process does not have to be dynamic, and could very well be static in nature via configuration. Either at specified intervals or when changes occur within the WLAN zone regarding Mobility VLANs being served, the information of the Mobility VLANs and their respective WLAN Zone Id are tabulated and sent to the other WLAN Mobility VLAN gateways using the Mobility gateway tunnels in the form of unicast packets encapsulated in the pre-chosen format between any pair of WLAN Mobility VLAN gateways.

As example of such a tiered WLAN topology in accordance with embodiments of the invention will now be described. Referring to FIG. 1 a prior art WLAN server topology 10 is shown. In this example the server topology 10 includes six MVLAN servers. While only six MVLAN servers are shown, this is only for the sake of explanation, and in actuality, there could be many more or less MVLAN servers in a topology. Also, other devices (e.g., access points, remote devices, router and switches) are not shown, again for the sake of explanation only.

The MVLAN servers 1-6 are in a full mesh arrangement. There exists a single mobility tunnel between each pair of MVLAN servers. Each MVLAN server informs the Mobility Controller of the MVLAN it serves and the Mobility Controller in turn disseminates this information to all MVLAN servers in the zone. Based on those advertisements, the MS builds a VLAN Server Table (VST) in that mobility switch, such that each switch knows which peer has access to which VLANs. The mobility tunnels are maintained using keep alive packets. These are periodic packets which are sent across this tunnel. A respective mobility tunnel is instantiated between MVLAN server 1 and each of MVLAN servers 2-6, between MVLAN server 2 and each of MVLAN servers 3-6, between MVLAN server 3 and each of MVLAN servers 4-6, between MVLAN server 4 and each of MVLAN servers 5-6, and between MVLAN server 5 and MVLAN server 6. In this example a total of fifteen mobility tunnels are required to interconnect the six MVLAN servers.

Figure 2:
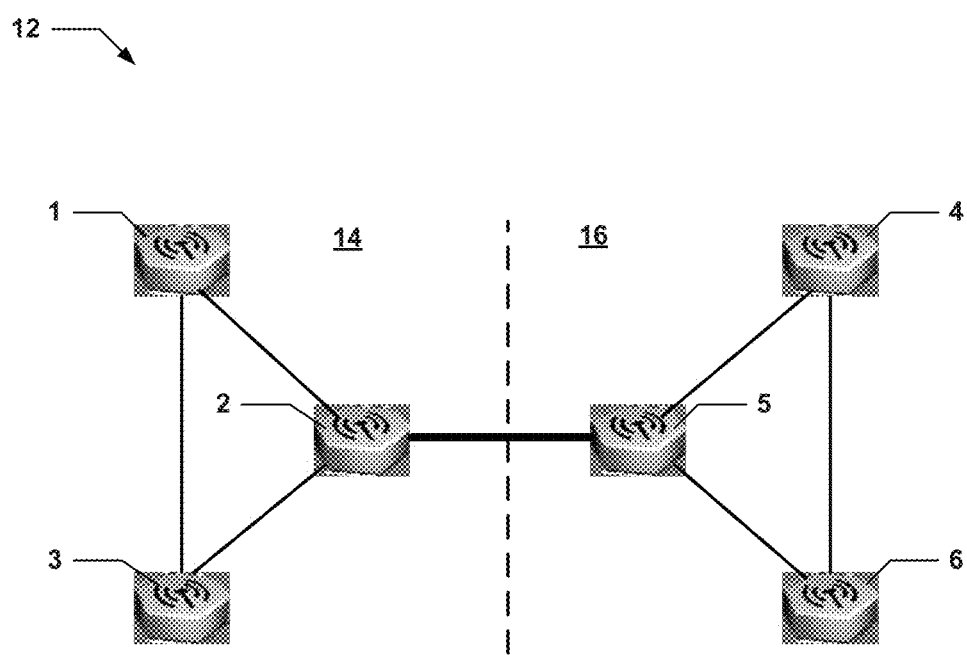
FIG. 2 comprises a block diagram of a tiered WLAN server topology wherein a zone has a mesh topology in accordance with embodiments of the invention.

Referring now to FIG. 2, the same six MVLAN servers are now arranged in a tiered topology 12 in accordance with embodiments of the present invention, utilizing mobility tunnels and mobility gateway tunnels. A mobility gateway tunnel is a special mobility tunnel negotiated between two Mobility VLAN gateway Servers whose capabilities including the packet encapsulation for traffic carried within the tunnel and that is negotiated between the two tunnel owners. A mobility gateway tunnel is identified by the end-point network addresses. A first domain 14 includes MVLAN servers 1-3 and has a first WLAN zone ID. Also shown is a second domain 16 includes MVLAN servers 4-6 and has a second WLAN zone ID. Domain 14 has a MVLAN gateway server 2 and domain 16 has its MVLAN gateway server 5.

Within a WLAN Mobility zone the MVLAN Servers (including the MVLAN gateway server) form a complete mesh by connecting to each other via Mobility Tunnels. In domain 14, there exists mobility tunnels between MVLAN severs 1 and 3, as well as between MVLAN server 1 and MVLAN gateway server 2 and also between MVLAN server 3 and MVLAN gateway server 2. Similarly, in domain 16, there exists mobility tunnels between MVLAN severs 4 and 6, as well as between MVLAN server 4 and MVLAN gateway server 5 and also between MVLAN sever 6 and MVLAN gateway server 5. MVLAN gateway server 2 is in communication with MVLAN gateway server 5 by way of a gateway tunnel. In this tiered topology 12 instead of 15 mobility tunnels, there are six mobility tunnels (between MVLAN server 1 and 3, between MVLAN server 1 and MVLAN gateway server 2 and between MVLAN server 3 and MVLAN gateway server 2 in domain 14 and between MVLAN server 4 and 6, between MVLAN server 4 and MVLAN gateway server 5 and between MVLAN server 6 and MVLAN gateway server 5 in domain 16) and one gateway tunnel between MVLAN gateway server 2 and MVLAN gateway server 5.

Figure 3:
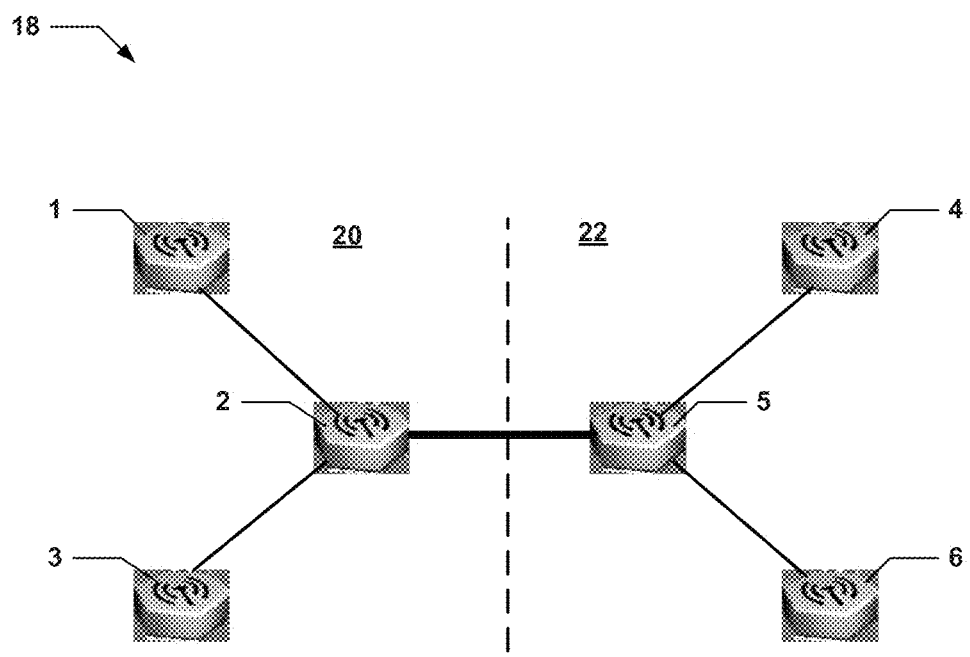
FIG. 3 comprises a block diagram of a tiered WLAN server topology wherein a zone has a star topology in accordance with embodiments of the invention.

Depending on the deployment size and the MVLAN server's capabilities, if the Mobility Tunnels are a serious drain on the MVLAN servers ability to function well, the topology can be further refined by extending the capability of the MVLAN gateway to act as the representative of all the MVLANs served also internally within the zone. This way within the zone every WLAN MVLAN server creates a single Mobility Tunnel to the MVLAN gateway Server and it is the MVLAN gateway server that becomes the relay station for all the traffic that would otherwise be sent over a single Mobility tunnel. This way the topology formed by the MVLAN Servers is converted to local star topologies connected via full mesh formed by the interconnected MVLAN gateways. The downside of this is the extra hop the traffic makes through the MVLAN gateway. This shown in FIG. 3. Here, topology 18 includes domains 20 and 22. In domain 20 there exist mobility tunnels between MVLAN server 1 and MVLAN gateway server 2 and also between MVLAN server 3 and MVLAN gateway server 2. Similarly, in domain 22, there exists mobility tunnels between MVLAN server 4 and MVLAN gateway server 5 and also between MVLAN sever 6 and MVLAN gateway server 5. MVLAN gateway server 2 is in communication with MVLAN gateway server 5 by way of a gateway tunnel. In this tiered topology 18 instead of six mobility tunnels, there are four mobility tunnels (between MVLAN server 1 and MVLAN gateway server 2 and between MVLAN server 3 and MVLAN gateway server 2 in domain 20 and between MVLAN server 4 and MVLAN gateway server 5 and between MVLAN server 6 and MVLAN gateway server 5 in domain 22) and one gateway tunnel between MVLAN gateway server 2 and MVLAN gateway server 5.

As described above, the conventional flat WLAN Mobility VLAN Domain is broken into zones forming a tiered topology. This is accomplished by assigning an Identification to each zone and designating in each zone a Mobility VLAN Server as the Mobility VLAN gateway Server that represents this zone to the other zones and vice-versa. In other words the Mobility VLAN gateway Server advertises to the other zones itself as the server of the MVLANs served by all the MVLAN Servers in its zone and in addition advertises itself inside its zone as the MVLAN Server for all the MVLANs served by all the MVLAN Servers in all the other zones. Each Mobility VLAN gateway implements two tables, one representing all the internal to the zone MVLANs and servers by mapping a Mobility VLAN served to the Mobility VLAN Server network address and another table representing the MVLANs served by the Mobility VLAN servers in all the other zones where the MVLAN is mapped to the network address of the Mobility VLAN gateway server. Mobility VLAN gateway Servers connect inside their zone to all the WLAN Mobility VLAN servers via Mobility Tunnels and connect outside their zone to all other designated Mobility VLAN gateways via Mobility gateway tunnels.

As an example deployment of this, consider a building within a campus forms a domain that deploys WLAN Split-Plane using their existing switches running over a SPBM network. A second building of the same campus forms a different domain by using a WLAN Split-Plane Server deployment running over IPVPN-Lite network and a third building forming a different domain uses the classic WLAN Mobility VLAN server running over an IPv4 network. The network administrator chooses in each domain a distinct WLAN Mobility VLAN server and designates it as the WLAN Mobility VLAN gateway for the specific zone. Each Mobility VLAN gateway communicates with the other Mobility VLAN gateways and they create point-to-point Mobility VLAN Mobility gateway tunnels between the three of them forming a triangle. The Mobility tunnels within the first network use SPBM packet encapsulation; those in the second building use IPVPN-Lite encapsulation and the those of the third domain use CAPWAP encapsulation for the traffic they handle internal to their zone. The Mobility VLAN gateway tunnel that connects the first and second areas can use either SPBM or IPVPN-Lite encapsulation (only one of those gateways will have to do packet translation) whereas the Mobility VLAN Mobility gateway tunnels from the first and second to the third zone will use CAPWAP encapsulation.

Figure 4:
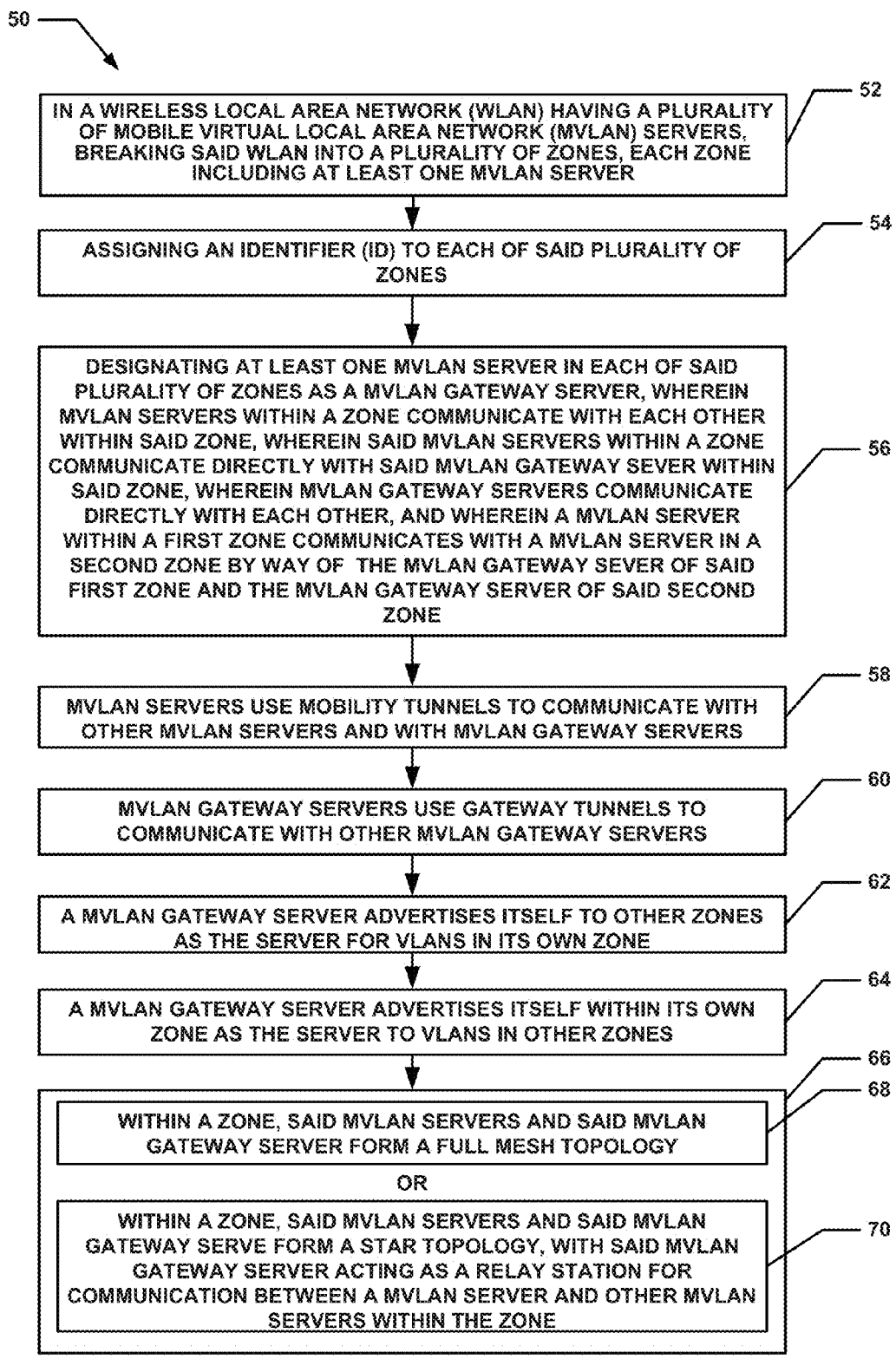
FIG. 4 comprises a flow diagram of a particular embodiment of method of providing a tiered WLAN server topology in accordance with embodiments of the invention.

A flow diagram of a particular embodiment of the presently disclosed method of forming a tiered WLAN sever topology is depicted in FIG. 4. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a flow diagram of a particular embodiment of a method 50 for forming a tiered WLAN server topology is shown. Method 50 stars with processing block 52 which discloses in a Wireless Local Area Network (WLAN) having a plurality of Mobile Virtual Local Area Network (MVLAN) servers, breaking said WLAN into a plurality of zones, each zone including at least one MVLAN server. Each zone maybe running a different network protocol.

Processing block 54 states assigning an Identifier (ID) to each of said plurality of zones. This is used to identify a particular zone among a plurality of zones.

Processing block 56 recites designating at least one MVLAN server in each of said plurality of zones as a MVLAN gateway server, wherein MVLAN servers within a zone communicate with each other within said zone, wherein said MVLAN servers within a zone communicate directly with said MVLAN gateway sever within said zone, wherein MVLAN gateway servers communicate directly with each other, and wherein a MVLAN server within a first zone communicates with a MVLAN server in a second zone by way of the MVLAN gateway sever of said first zone and the MVLAN gateway server of said second zone.

Processing block 58 discloses wherein MVLAN servers use mobility tunnels to communicate with other MVLAN servers and with MVLAN gateway servers. Mobility tunnels are established with other peer mobility switches, and then the mobility switch (MS) exchanges advertisements on whichever VLAN servers are on those switches. Based on those advertisements, the MS builds a VLAN Server Table (VST) in that mobility switch, such that each switch knows which peer has access to which VLANs. The mobility tunnels are maintained using keep alive packets. These are periodic packets which are sent across this tunnel.

Processing block 60 states wherein different gateway servers use mobility gateway tunnels to communicate with other MVLAN gateway servers. A mobility gateway tunnel is a special mobility tunnel negotiated between two Mobility VLAN gateway Servers whose capabilities including the packet encapsulation for traffic carried within the tunnel and that is negotiated between the two tunnel owners. A mobility gateway tunnel is identified by the end-point network addresses.

Processing block 62 recites wherein a MVLAN gateway server advertises itself to other zones as the server for VLANS in its own zone. Processing block 64 discloses wherein a MVLAN gateway server advertises itself within its own zone as the server to VLANs in other zones.

Processing block 66 shows the MVLAN servers and the MVLAN gateway server within a zone can be organized in one of two configurations. As shown in processing block 68 within a zone, the MVLAN servers and the MVLAN gateway server form a full mesh topology. In a full mesh topology each MVLAN serve has a mobility tunnel to every other MVLAN server and to the mobility gateway server within the domain. Alternately, as shown in processing block 70, within a zone, the MVLAN servers and the MVLAN gateway server form a star topology, with the MVLAN gateway server acting as a relay station for communication between a MVLAN server and other MVLAN servers within the zone. In a star topology, every MVLAN sever has a mobility tunnel to the mobility gateway server, but not to other MVLAN servers within the domain.

Figure 5:
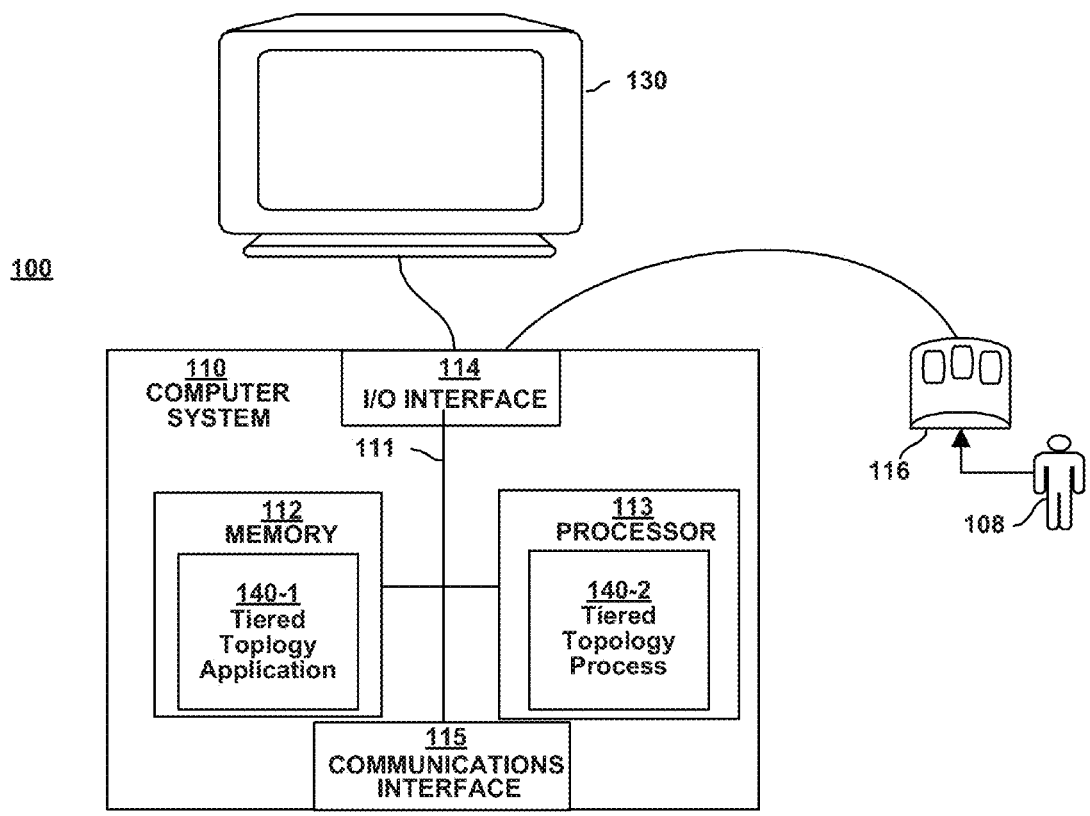
FIG. 5 illustrates an example computer system architecture for a MVLAN gateway server in accordance with embodiments of the invention.

FIG. 5 is a block diagram illustrating example architecture of a computer system (e.g., a MVLAN gateway server) 110 that executes, runs, interprets, operates or otherwise performs a tiered topology application 140-1 and tiered topology process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the tiered topology application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a tiered topology application 140-1 as explained herein. The tiered topology application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a tiered topology application 140-1. Execution of a tiered topology application 140-1 in this manner produces processing functionality in the tiered topology process 140-2. In other words, the tiered topology process 140-2 represents one or more portions or runtime instances of a tiered topology application 140-1 (or the entire a tiered topology application 140-1) performing or executing within or upon the processor 113 in the computerized device 110 at runtime.

It is noted that example configurations disclosed herein include the tiered topology application 140-1 itself (i.e., in the form of un-executed or non-performing logic instructions and/or data). The tiered topology application 140-1 may be stored on a computer readable medium (such as a floppy disk), hard disk, electronic, magnetic, optical, or other computer readable medium. A tiered topology application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a tiered topology application 140-1 in the processor 113 as the tiered topology process 140-2. Those skilled in the art will understand that the computer system 110 may include other processes and/or software and hardware components, such as an operating system not shown in this example.

A display 130 need not be coupled directly to computer system 110. For example, the tiered topology application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the tiered topology application 140-1. Execution of tiered topology application 140-1 produces processing functionality in tiered topology process 140-2. In other words, the tiered topology process 140-2 represents one or more portions of the tiered topology application 140-1 (or the entire application) performing within or upon the processor 113 in the computer system 100.

It should be noted that, in addition to the tiered topology process 140-2, embodiments herein include the tiered topology application 140-1 itself (i.e., the un-executed or non-performing logic instructions and/or data). The tiered topology application 140-1 can be stored on a computer readable medium such as a floppy disk, hard disk, or optical medium. The tiered topology application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of tiered topology application 140-1 in processor 113 as the tiered topology process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
in a Wireless Local Area Network (WLAN) having a plurality of Mobility Virtual Local Area Network (MVLAN) servers, breaking said WLAN into a plurality of zones, each zone including at least one MVLAN server;
assigning an Identifier (ID) to each of said plurality of zones; and
designating at least one MVLAN server in each of said plurality of zones as a MVLAN gateway server, wherein MVLAN servers within a zone communicate directly with said MVLAN gateway server within said zone, wherein said MVLAN gateway servers communicate directly with each other, wherein said MVLAN gateway server advertises itself to other zones as the server for the MVLAN servers in its own zone and also advertises itself within its own zone as the server to the MVLAN servers in other zones, and wherein a MVLAN server within a first zone communicates with a MVLAN server in a second zone by way of the MVLAN gateway server of said first zone and the MVLAN gateway server of said second zone, and wherein said MVLAN servers are arranged in a tiered topology.

2. The method of claim 1 wherein the MVLAN servers use mobility tunnels to communicate with other MVLAN servers and with MVLAN gateway servers.

3. The method of claim 1 wherein, within a zone, said MVLAN servers and said MVLAN gateway server form a full mesh topology.

4. The method of claim 1 wherein, within a zone, said MVLAN servers and said MVLAN gateway server form a star topology, with said MVLAN gateway server acting as a relay station for communication between a MVLAN server and other MVLAN servers within the zone.

5. The method of claim 1 wherein a WLAN Mobility VLAN Domain is broken into said zones forming said tiered topology by assigning an Identification to each zone and designating in each zone a Mobility VLAN Server as the Mobility VLAN gateway Server that represents this zone to the other zones and vice-versa.

6. A computer program product for forming a tiered Wireless Local Area Network (WLAN) server topology having a plurality of Mobility Virtual Local Area Network (MVLAN) servers, the WLAN separated into a plurality of zones, each zone including at least one MVLAN server, the computer program product comprising:
a non-transitory computer readable storage medium having computer readable program code embodied therewith, the computer readable program code, comprising:
computer readable program code for assigning an Identifier (ID) to each of said plurality of zones; and
computer readable program code for designating at least one MVLAN server in each of said plurality of zones as a MVLAN gateway server, wherein said MVLAN servers within a zone communicate directly with said MVLAN gateway server within said zone, wherein said MVLAN gateway servers communicate directly with each other, wherein said MVLAN gateway server advertises itself to other zones as the server for the MVLAN servers in its own zone and also advertises itself within its own zone as the server to the MVLAN servers in other zones, and wherein a MVLAN server within a first zone communicates with a MVLAN server in a second zone by way of the MVLAN gateway server of said first zone and the MVLAN gateway server of said second zone, and wherein said MVLAN servers are arranged in a tiered topology.

7. The computer program product of claim 6 wherein MVLAN servers use mobility tunnels to communicate with other MVLAN servers and with MVLAN gateway servers.

8. The computer program product of claim 6 wherein, within a zone, said MVLAN servers and said MVLAN gateway server form a full mesh topology.

9. The computer program product of claim 6 wherein, within a zone, said MVLAN servers and said MVLAN gateway server form a star topology, with said MVLAN gateway server acting as a relay station for communication between a MVLAN server and other MVLAN servers within the zone.

10. The computer program product of claim 6 wherein a WLAN Mobility VLAN Domain is broken into said zones forming said tiered topology by assigning an Identification to each zone and designating in each zone a Mobility VLAN Server as the Mobility VLAN gateway Server that represents this zone to the other zones and vice-versa.

11. A server comprising:
a memory;
a processor;
a communications interface;
an interconnection mechanism coupling the memory, the processor and the communications interface; and
wherein the memory is encoded with an application providing a tiered Wireless Local Area Network (WLAN) server topology having a plurality of Mobility Virtual Local Area Network (MVLAN) servers, the WLAN separated into a plurality of zones, each zone including at least one MVLAN server, the application, when performed on the processor, causes the server to perform the operations of:
designating a MVLAN server within a first zone of the WLAN as a MVLAN gateway server, wherein said first zone comprises a plurality of MVLAN servers;
causing the MVLAN gateway server to advertise itself to other zones as the server for the MVLAN servers in the first zone;
causing the MVLAN gateway server to advertise itself within the first zone as the server to MVLAN servers in other zones;
wherein said MVLAN gateway server communicates directly with other MVLAN gateway servers using mobility gateway tunnels, and wherein a MVLAN server within said first zone communicates with a MVLAN server in a second zone by way of said MVLAN gateway server of said first zone and a MVLAN gateway server of said second zone.

12. The server of claim 11 wherein said MVLAN servers use mobility tunnels to communicate with said MVLAN gateway server.

13. The server of claim 11 wherein, within said first zone, said MVLAN servers and said MVLAN gateway server form one of the group consisting of a full mesh topology; and a star topology, with said MVLAN gateway server acting as a relay station for communication between a MVLAN server and other MVLAN servers within the first zone.

14. The server of claim 11 wherein a WLAN Mobility VLAN Domain is broken into said zones forming said tiered topology by assigning an Identification to each zone and designating in each zone a Mobility VLAN Server as the Mobility VLAN gateway Server that represents this zone to the other zones and vice-versa.

15. The server of claim 11, wherein the server is the MVLAN gateway server for the first zone.

* * * * *

UNITED STATES PATENT AND TRADEMARK OFFICE
CERTIFICATE OF CORRECTION

PATENT NO. : 9,674,767 B2
APPLICATION NO. : 13/224413
DATED : June 6, 2017
INVENTOR(S) : Alexandros Moisiadis et al.

Page 1 of 1

It is certified that error appears in the above-identified patent and that said Letters Patent is hereby corrected as shown below:

On the Title Page

Abstract, Line 12, "MVLAN gateway sever within the zone" should read --MVLAN gateway server within the zone--

Abstract, Line 16, "MVLAN gateway sever of the first zone" should read --MVLAN gateway server of the first zone--

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*